United States Patent
Mahaffey et al.

(10) Patent No.: US 8,271,608 B2
(45) Date of Patent: *Sep. 18, 2012

(54) SYSTEM AND METHOD FOR A MOBILE CROSS-PLATFORM SOFTWARE SYSTEM

(75) Inventors: Kevin Patrick Mahaffey, San Francisco, CA (US); John G. Hering, San Francisco, CA (US); James David Burgess, San Francisco, CA (US)

(73) Assignee: Lookout, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,937

(22) Filed: Dec. 7, 2011

(65) Prior Publication Data

US 2012/0084864 A1    Apr. 5, 2012

Related U.S. Application Data

(63) Continuation of application No. 12/255,626, filed on Oct. 21, 2008, now Pat. No. 8,099,472.

(51) Int. Cl.
  *G06F 15/16* (2006.01)
(52) U.S. Cl. ..... 709/217; 709/218; 709/219; 705/14.43; 705/14.45; 370/217; 370/230
(58) Field of Classification Search .......... 709/217–219; 705/14.43–14.45; 370/217, 230
See application file for complete search history.

(56) References Cited

U.S. PATENT DOCUMENTS

| | | | |
|---|---|---|---|
| 5,319,776 | A | 6/1994 | Hile et al. |
| 6,272,353 | B1 | 8/2001 | Dicker et al. |
| 6,301,668 | B1 | 10/2001 | Gleichauf et al. |
| 6,529,143 | B2 | 3/2003 | Mikkola et al. |
| 6,792,543 | B2 | 9/2004 | Pak et al. |
| 6,907,530 | B2 | 6/2005 | Wang |

(Continued)

FOREIGN PATENT DOCUMENTS

GB    2430588  A1    3/2007

(Continued)

OTHER PUBLICATIONS

U.S. Appl. No. 12/255,635. Prosecution history available via USPTO IFW (including Office Action dated Mar. 24, 2011 and references cited.).

(Continued)

*Primary Examiner* — Wing Chan
*Assistant Examiner* — Razu Miah
(74) *Attorney, Agent, or Firm* — Dergosits & Noah LLP

(57) ABSTRACT

The present invention is a system and method for creating, developing and testing cross-platform software for mobile communications devices. The invention enables mobile device software that must be highly-integrated with the operating system on which it runs to be implemented in a cross-platform manner. Security software for mobile devices is a prime beneficiary of the present invention, as a substantial proportion of its functionality is identical between different platforms yet integrated very specifically into each platform it supports. The cross-platform system includes a core platform-independent component, a platform-specific component, and an abstraction layer component, each of which may communicate with each other using a common defined API. The present invention enables the platform-independent component to be completely re-used between platforms and allows the platform-specific and abstraction components to contain minimal amounts of code on each platform.

10 Claims, 9 Drawing Sheets

U.S. PATENT DOCUMENTS

| | | | |
|---|---|---|---|
| 6,959,184 B1 | 10/2005 | Byers et al. | |
| 7,069,589 B2 | 6/2006 | Schmall et al. | |
| 7,096,368 B2* | 8/2006 | Kouznetsov et al. | 713/189 |
| 7,123,933 B2* | 10/2006 | Poor et al. | 455/552.1 |
| 7,127,455 B2 | 10/2006 | Carson et al. | |
| 7,171,690 B2 | 1/2007 | Kouznetsov et al. | |
| 7,210,168 B2 | 4/2007 | Hursey et al. | |
| 7,228,566 B2* | 6/2007 | Caceres et al. | 726/25 |
| 7,236,598 B2 | 6/2007 | Sheymov et al. | |
| 7,237,264 B1 | 6/2007 | Graham et al. | |
| 7,266,810 B2 | 9/2007 | Karkare et al. | |
| 7,290,276 B2 | 10/2007 | Ogata | |
| 7,308,256 B2 | 12/2007 | Morota et al. | |
| 7,356,835 B2 | 4/2008 | Gancarcik et al. | |
| 7,376,969 B1 | 5/2008 | Njemanze et al. | |
| 7,386,297 B2 | 6/2008 | An | |
| 7,392,043 B2 | 6/2008 | Kouznetsov et al. | |
| 7,392,543 B2 | 6/2008 | Szor | |
| 7,401,359 B2 | 7/2008 | Gartside et al. | |
| 7,415,270 B2 | 8/2008 | Wilhelmsson et al. | |
| 7,467,206 B2 | 12/2008 | Moore et al. | |
| 7,525,541 B2 | 4/2009 | Chun et al. | |
| 7,634,800 B2 | 12/2009 | Ide et al. | |
| 7,685,132 B2 | 3/2010 | Hyman | |
| 7,774,637 B1 | 8/2010 | Beddoe et al. | |
| 7,809,353 B2 | 10/2010 | Brown et al. | |
| 7,856,373 B2 | 12/2010 | Ullah | |
| 7,861,303 B2 | 12/2010 | Kouznetsov et al. | |
| 7,907,966 B1* | 3/2011 | Mammen | 455/557 |
| 2001/0044339 A1 | 11/2001 | Cordero et al. | |
| 2002/0042886 A1 | 4/2002 | Lahti et al. | |
| 2002/0087483 A1* | 7/2002 | Harif | 705/76 |
| 2002/0108058 A1 | 8/2002 | Iwamura | |
| 2002/0183051 A1* | 12/2002 | Poor et al. | 455/418 |
| 2002/0183060 A1 | 12/2002 | Ko et al. | |
| 2002/0191018 A1 | 12/2002 | Broussard | |
| 2003/0028803 A1 | 2/2003 | Bunker et al. | |
| 2003/0046134 A1* | 3/2003 | Frolick et al. | 705/8 |
| 2003/0079145 A1* | 4/2003 | Kouznetsov et al. | 713/200 |
| 2003/0120951 A1 | 6/2003 | Gartside et al. | |
| 2003/0131148 A1* | 7/2003 | Kelley et al. | 709/321 |
| 2004/0022258 A1 | 2/2004 | Tsukada et al. | |
| 2004/0133624 A1 | 7/2004 | Park | |
| 2004/0185900 A1 | 9/2004 | McElveen | |
| 2004/0225887 A1 | 11/2004 | O'Neil et al. | |
| 2005/0015443 A1 | 1/2005 | Levine et al. | |
| 2005/0060272 A1* | 3/2005 | Lin | 706/12 |
| 2005/0074106 A1 | 4/2005 | Orlamunder et al. | |
| 2005/0076246 A1 | 4/2005 | Singhal | |
| 2005/0091308 A1 | 4/2005 | Bookman et al. | |
| 2005/0125779 A1* | 6/2005 | Kelley et al. | 717/138 |
| 2005/0130627 A1 | 6/2005 | Calmels et al. | |
| 2005/0138395 A1 | 6/2005 | Benco et al. | |
| 2005/0154796 A1 | 7/2005 | Forsyth | |
| 2005/0197099 A1 | 9/2005 | Nehushtan | |
| 2005/0227669 A1 | 10/2005 | Haparnas | |
| 2005/0237970 A1 | 10/2005 | Inoue | |
| 2005/0278777 A1 | 12/2005 | Loza | |
| 2005/0282533 A1 | 12/2005 | Draluk | |
| 2006/0073820 A1 | 4/2006 | Craswell et al. | |
| 2006/0075388 A1* | 4/2006 | Kelley et al. | 717/124 |
| 2006/0080680 A1 | 4/2006 | Anwar et al. | |
| 2006/0095454 A1 | 5/2006 | Shankar et al. | |
| 2006/0130145 A1 | 6/2006 | Choi et al. | |
| 2006/0218482 A1 | 9/2006 | Ralston et al. | |
| 2006/0224742 A1 | 10/2006 | Shahbazi | |
| 2006/0253584 A1 | 11/2006 | Dixon et al. | |
| 2006/0277408 A1 | 12/2006 | Bhat et al. | |
| 2006/0294582 A1 | 12/2006 | Linsley-Hood et al. | |
| 2007/0005327 A1 | 1/2007 | Ferris | |
| 2007/0011319 A1 | 1/2007 | McClure et al. | |
| 2007/0016953 A1 | 1/2007 | Morris et al. | |
| 2007/0016955 A1 | 1/2007 | Goldberg et al. | |
| 2007/0028095 A1 | 2/2007 | Allen et al. | |
| 2007/0028304 A1 | 2/2007 | Brennan | |
| 2007/0050471 A1 | 3/2007 | Patel et al. | |
| 2007/0154014 A1 | 7/2007 | Aissi et al. | |
| 2007/0174472 A1 | 7/2007 | Kulakowski | |
| 2007/0186282 A1 | 8/2007 | Jenkins | |
| 2007/0214504 A1 | 9/2007 | Comparetti et al. | |
| 2007/0220608 A1 | 9/2007 | Lahti et al. | |
| 2007/0240218 A1 | 10/2007 | Tuvell et al. | |
| 2007/0240221 A1 | 10/2007 | Tuvell et al. | |
| 2007/0240222 A1 | 10/2007 | Tuvell et al. | |
| 2007/0250627 A1 | 10/2007 | May et al. | |
| 2007/0293263 A1 | 12/2007 | Eslambolchi et al. | |
| 2007/0297610 A1 | 12/2007 | Chen et al. | |
| 2008/0028470 A1 | 1/2008 | Remington et al. | |
| 2008/0046557 A1* | 2/2008 | Cheng | 709/224 |
| 2008/0047007 A1 | 2/2008 | Satkunanathan et al. | |
| 2008/0065507 A1 | 3/2008 | Morrison et al. | |
| 2008/0070495 A1 | 3/2008 | Stricklen et al. | |
| 2008/0072329 A1 | 3/2008 | Herschaft | |
| 2008/0086773 A1 | 4/2008 | Tuvell et al. | |
| 2008/0086776 A1 | 4/2008 | Tuvell et al. | |
| 2008/0109871 A1 | 5/2008 | Jacobs | |
| 2008/0127171 A1 | 5/2008 | Tarassov | |
| 2008/0127179 A1 | 5/2008 | Moss et al. | |
| 2008/0127334 A1 | 5/2008 | Gassoway | |
| 2008/0127336 A1 | 5/2008 | Sun et al. | |
| 2008/0132218 A1 | 6/2008 | Samson et al. | |
| 2008/0134281 A1 | 6/2008 | Shinde et al. | |
| 2008/0140767 A1 | 6/2008 | Rao et al. | |
| 2008/0148381 A1 | 6/2008 | Aaron | |
| 2008/0172746 A1 | 7/2008 | Lotter et al. | |
| 2008/0178294 A1 | 7/2008 | Hu et al. | |
| 2008/0181116 A1 | 7/2008 | Kavanaugh et al. | |
| 2008/0196104 A1 | 8/2008 | Tuvell et al. | |
| 2008/0200160 A1 | 8/2008 | Fitzpatrick et al. | |
| 2008/0208950 A1 | 8/2008 | Kim et al. | |
| 2008/0209557 A1 | 8/2008 | Herley et al. | |
| 2008/0276111 A1 | 11/2008 | Jacoby et al. | |
| 2009/0199298 A1 | 8/2009 | Miliefsky | |
| 2010/0064341 A1 | 3/2010 | Aldera | |
| 2010/0154032 A1 | 6/2010 | Ollmann | |
| 2010/0313270 A1 | 12/2010 | Kim et al. | |
| 2010/0332593 A1 | 12/2010 | Barash et al. | |

FOREIGN PATENT DOCUMENTS

| | | | |
|---|---|---|---|
| WO | WO2005101789 A1 | 10/2005 | |
| WO | WO2008007111 A1 | 1/2008 | |

OTHER PUBLICATIONS

U.S. Appl. No. 12/255,626. Prosecution history available via USPTO IFW (including Office Action dated Feb. 1, 2011 and references cited.).

U.S. Appl. No. 12/255,621. Prosecution history available via USPTO IFW (including Office Action dated Apr. 13, 2011 and references cited.).

U.S. Appl. No. 12/255,614. Prosecution history available via USPTO IFW (including Office Action dated Apr. 14, 2011 and references cited.).

McAfee, Internet Archive, Way Back Machine, available at <http://web.archive.org/web/20080517102505/www.mcafeesecure.com/us/technology-intro.jsp>, retrieved Feb. 23, 2011, 2 pages.

Qualys, "Executive Dashbard," Internet Archive, Way Back Machine, available at <http://web.archive.org/web/200805071614171www.qualys.com/products/screens/?screen=Executive+Dashboard>, retrieved Feb. 23, 2011, 1 page.

Qualys, "Vulnerability Management," Internet Archive, Way Back Machine, available at <http://web.archive.org/web/20080611095201/www.qualys.com/solutions/vulnerabilitLmanagement> retrieved Feb. 24, 2011, 1 page.

Teh, Joe, "Norton 360 Version 3.0 Review," Mar. 9, 2009, available at <http://techielobang.com/blog/2009/03/09/norton-360-version-30-review/> retrieved Feb. 23, 2011, 12 pages.

Windows Update, Internet Archive, Way Back Machine, available at <http://web.archive.org/web/20071022193017/http://en.wikipedia.org/wikiIWindows_Update> retrieved Feb. 23, 2011, 3 pages.

Notification of Transmittal of the International Search Report and the Written Opinion of the International Searching Authority, of the Declaration for PCTUS2009/061370 mailed on Dec. 14, 2009.

Notification of Transmittal of the International Search Report and the Written Opinion of the International Searching Authority, of the Declaration for PCTUS2009/061372 mailed on Mar. 24, 2010.

Dashwire: Manage Your Cell Phone on the Web, News Blog, Jessica Dolcourt, Oct. 29, 2007 5:00 AM PCT pp. 1-3.

"Real world Computing" Jun. 16, 2008 (PC Pro) pp. 1.

"PhoneBak PDA Phone Anti-theft software for your PDA phone", 2007 Bak2u Pte (Singapore), pp. 1-4.

"PhoneBak PDA: Mobile Phone Theft Recovery Software", 2007 Westin Tech.

"F-Secure Mobile Security for S60 User's Guide," F-Secure Corporation 2009, 34 pages.

"Kaspersky Mobile Security," Kaspersky Lab 1997-2007, 1 page.

"Berry Locator," 2007, Mobireport LLC, 1 page.

"Java Virtual Machine," Wikipedia, Aug. 7, 2011, available at <http://en.wikipedia.org/wiki/Java_Virtual_Machine> retrieved Aug. 10, 2011, 7 pages.

"Firefox," Wikipedia, Jul. 20, 2011, available at <http://en.wikipedia.org/wiki/firefox> retrieved Aug. 10, 2011, 37 pages.

Grafio "Stay Secure," Opera Software, Sep. 29, 2008, available at <http://widgets.opera.com/widget/4495> retrieved Oct. 21, 2008, 4 pages.

"Symantec Endpoint Protection," Symantec, 2008, available at <http://www.symantec.com/business/products/family.jsp?familyid=endpointsecurity>, 6 pages.

"Symantec Mobile Security Suite for Windows Mobile," Symantec, 2008, available at <http://www.symantec.com/business/products/sysreg.jsp?pcid=2241&pvid=mobile_security_suite_1>, 5 pages.

"Norton Smartphone Security," Symantec, 2007, available at <http://www.symantec.com/norton/smartphone-security> retrieved Oct. 21, 2008, 2 pages.

U.S. Appl. No. 12/255,632. Prosecution history available via USPTO IFW (including Notice of Allowance dated Nov. 3, 2011, and references cited).

"Kaspersky Mobile Security," Kaspersky Lab 2008, available at <http://www.kaspersky.com/kaspersky_mobile_security>retrieved Sep. 11, 2008, 2 pages.

U.S. Appl. No. 12/255,614; Prosecution history available via USPTO IFW (including OA dated Apr. 14, 2011).

Virus Total, VT Community, www.virustotal.com/index.html (dated Dec. 16, 2011) 44 pages.

* cited by examiner

Example Simple Virus Scanning System Demonstrating Platform-Independent and Abstraction Layer Interdependence

Example Intrusion Prevention System

SYSTEM AND METHOD FOR A MOBILE CROSS-PLATFORM SOFTWARE SYSTEM

CROSS REFERENCE TO RELATED APPLICATIONS

The present application is a continuation of U.S. patent application Ser. No. 12/255,626, filed Oct. 21, 2008, entitled "SYSTEM AND METHOD FOR A MOBILE CROSS-PLATFORM SOFTWARE SYSTEM" and is related to the following U.S. Patents and co-pending U.S. Patent Applications: U.S. patent application Ser. No. 12/255,635, filed Oct. 21, 2008, issued as U.S. Pat. No. 8,060,936 on Nov. 15, 2011, entitled "SECURITY STATUS AND INFORMATION DISPLAY SYSTEM," U.S. patent application Ser. No. 12/255, 632, filed Oct. 21, 2008, entitled "SECURE MOBILE PLATFORM System," U.S. patent application Ser. No. 12/255,621, filed Oct. 21, 2008, entitled, "SYSTEM AND METHOD FOR ATTACK AND MALWARE PREVENTION," and U.S. patent application Ser. No. 12/255,614, filed Oct. 21, 2008, issued as U.S. Pat. No. 8,051,480 on Nov. 1, 2011, entitled "SYSTEM AND METHOD FOR MONITORING AND ANALYZING MULTIPLE INTERFACES AND MULTIPLE PROTOCOLS," all of which are hereby incorporated by reference.

FIELD

The present invention relates generally to mobile software, and specifically, to creating a cross-platform system for mobile communication devices.

BACKGROUND

The mobile market has grown significantly in the last few years. As new mobile communications devices come to market, each offers new sets of hardware features that are attractive and useful to consumers. Unfortunately, software development for mobile communications devices has not kept pace with hardware development. This is because each mobile communications device will often use a different operating system, software platform, or set of application program interfaces ("APIs"), even if each mobile communications device is made from the same manufacturer. Additionally, each mobile communications service provider or carrier will often customize the performance, configuration, and interface for each device that it services. As a result, there is wide divergence between the software platforms and software development for mobile communications devices.

In order to unify the different software platforms available for mobile communications devices in a market where there are numerous manufacturers and providers, there has been some effort to develop cross-platform solutions. Cross-platform refers to operating systems or software applications that are designed to work on multiple platforms without requiring significant changes to the underlying software code. In general, cross-platform architecture is more common and more easily implemented on desktop computing platforms due to the availability of memory and processing resources and the standardization of interfaces on each type of platform. Desktop cross-platform systems do not transfer well to mobile devices that lack these resources. Instead, cross-platform developers will sacrifice or adopt different methodologies in order to provide a system that is powerful enough to handle different applications across as many platforms as possible, while maintaining a low memory footprint.

The typical cross-platform system will comprise a component or module that is platform-independent, a component or module that is platform-specific, and an abstraction layer that may be utilized by either of the other components. These components or modules are generally software-based, but are designed to incorporate the commonalities and unique differences of the hardware upon which they are installed. Each component will communicate with others using its own API. This presents a problem in not having a uniform API for developers to use. In order to provide compatibility on as many devices as possible, developers will abstract the underlying platform such that the various differences are not apparent. For example, the abstraction layer's API is often designed to be general and non-specific to the platform upon which it operates or the functionality it is being used to implement. Additionally or alternatively, the cross-platform system may incorporate a powerful all-inclusive abstraction layer that provides some functionality that is duplicated between platforms, thereby implementing a general, multi-purpose layer. As such, the "powerful" abstraction layer is designed to account for all of the different features and desired functionalities implemented by utilizing that layer. While in theory, this provides some cross-platform features for arbitrary types of software, in reality, low-level features that require full integration with a device's operating system are ignored, since this type of abstraction layer design tends to isolate platform-specific and platform-independent components. Further, building such an all-inclusive abstraction layer requires a large body of software code, which can be difficult to manage when maintaining platform abstraction layers for different platforms. What is therefore needed is a way to develop and build a cross-platform system that provides both high and low-level mobile device integration without taxing mobile device resources. What is further needed is a cross-platform system that may be implemented on any mobile communications device, regardless of manufacturer or service provider. What is also needed is a more lightweight abstraction layer that does not compromise power or functionality.

Because of the design of previous cross-platform systems and methods, the testing or quality assurance ("QA") of these systems is tedious and difficult. Each platform-specific component must be tested. Changes to the code for the different components require writing new testing code to evaluate these new changes. What is therefore needed is a more efficient way to test the cross-platform system.

Currently, there are multiple mobile device operating systems that each cannot run software built for other operating systems. As such, developers must build software specifically for a mobile device operating system, and therefore the mobile software market is said to be "fragmented." Recently, there has been some effort to create common operating system environments for emerging mobile communications devices. For example, Google® and the Mobile Handset Alliance® have developed a mobile communications device platform and operating system called Android™. Other common operating systems such as Windows Mobile®, Apple iPhone™, Research in Motion's Blackberry®, and Symbian® also exist. While using a common operating system is an effective solution to reduce fragmentation, it is unlikely to eliminate the problem. As long as there are multiple platforms that have significant market-share, software applications will need to run on the multiple platforms in order to achieve market penetration.

Some developers endorse virtualization as a possible solution. For example, Java® ME has been proposed as a viable cross-platform for mobile communications devices. However, it is well-known that running a virtual machine on a mobile communications device will typically tax its resources to the point of significant performance degradation. Further, virtual machine architecture is designed to be generic and therefore offers little to no access to the particular device running the virtual machine software. As such, running a virtual machine on a mobile communications device is not a desirable solution for highly-integrated software, such as security software, drivers and other software that significantly interfaces with the device's operating system.

Another cross-platform solution for mobile communications devices is the adoption of a common binary runtime environment, such as Qualcomm's BREW®. However, BREW is proprietary and limited to devices built upon or approved by Qualcomm®. As such, there are significant limitations as to the type, scope and breadth of applications allowable on BREW. Additionally, developers are restricted from accessing the low-level (operating system) features of the mobile communications device, which limits the amount of customization and integration available.

While these early efforts provide some cross-platform functionality, they are not adequate for highly-integrated software. What is therefore needed is a more efficient way for creating, developing and testing a cross-platform system for mobile communications devices that is easy to manage, implement and update.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention is a system and method for creating, testing and providing a cross-platform software system for a mobile communications device. The present invention comprises a platform-independent or "core" component, a platform-specific component, and a lightweight abstraction layer component that may or may not be interdependent to the platform-independent core. The abstraction layer component may depend on the platform-independent component in order to access the functionalities of the platform-independent component. As will be explained further below, this architecture provides a cross-platform system on the mobile communications device platform without sacrificing functionality or power. Additionally, each component may communicate with the other using a common API, as opposed to different APIs as is common in the prior art. As will be also discussed further below, this architecture also streamlines the QA process since it allows for the re-use of testing code and systems.

As used herein, the term "mobile communications device" refers to mobile phones, PDAs and smartphones, but excludes laptop computers, notebook computers or sub-notebook computers. Specifically, mobile communications devices include devices for which voice communications are a primary function, but may offer data or other wireless Internet access capabilities. As used herein, a "mobile communications device" may also be referred to as a "mobile device," "mobile client," or "handset." However, a person having skill in the art will appreciate that while the present invention is disclosed herein as being used on mobile communications devices, the present invention may also be used on other computing platforms, including desktop, laptop, notebook, or server computers.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

A. System Architecture

Figure 1:
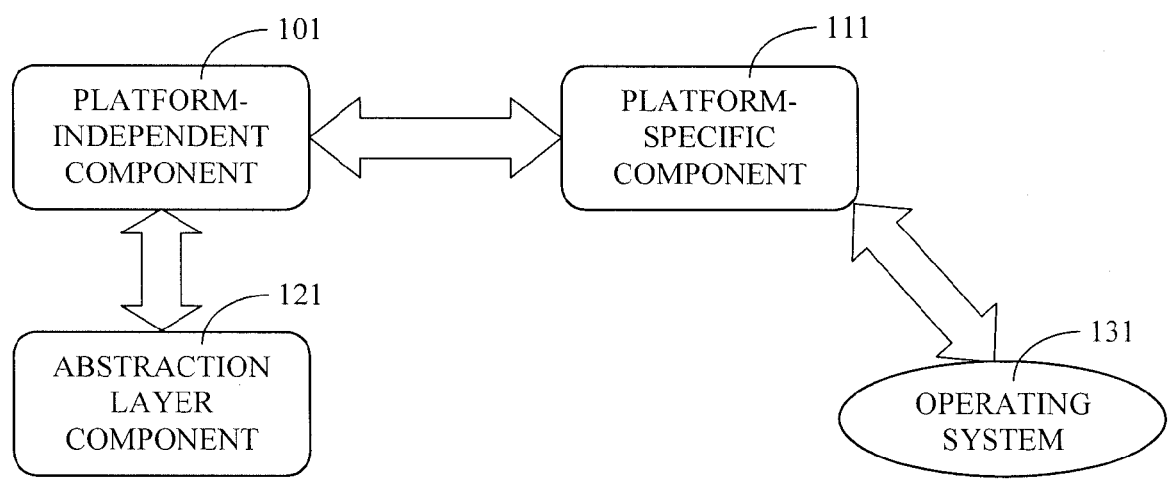
FIG. 1 is an exemplary block diagram depicting an embodiment of the present invention.

FIG. 1 illustrates an exemplary cross-platform system architecture embodiment of the present invention. As shown, the cross-platform system may include a core platform-independent software component 101 and a platform-specific component 111. In addition, the system may include an abstraction layer component 121 that is coupled with platform-independent component 101. The platform-independent component 101 may present a common API and may provide a code library common to all mobile communications device platforms, regardless of manufacturer, service provider or operating system. This common API may enable communication with portions of the present invention, such as platform-specific component 111, as well as other components of a mobile communications device. Similarly, platform-specific component 111 may communicate with portions of the present invention, such as platform-independent component 101, as well as other components of the mobile communications device, such as operating system 131. One will appreciate that the different components in FIG. 1 may communicate or implement functionalities with one another using respective APIs; however, in an embodiment, all of the components of FIG. 1 communicate using a common API. Despite their interconnectedness, each component may be purposefully and explicitly separate from the other.

Figure 5:
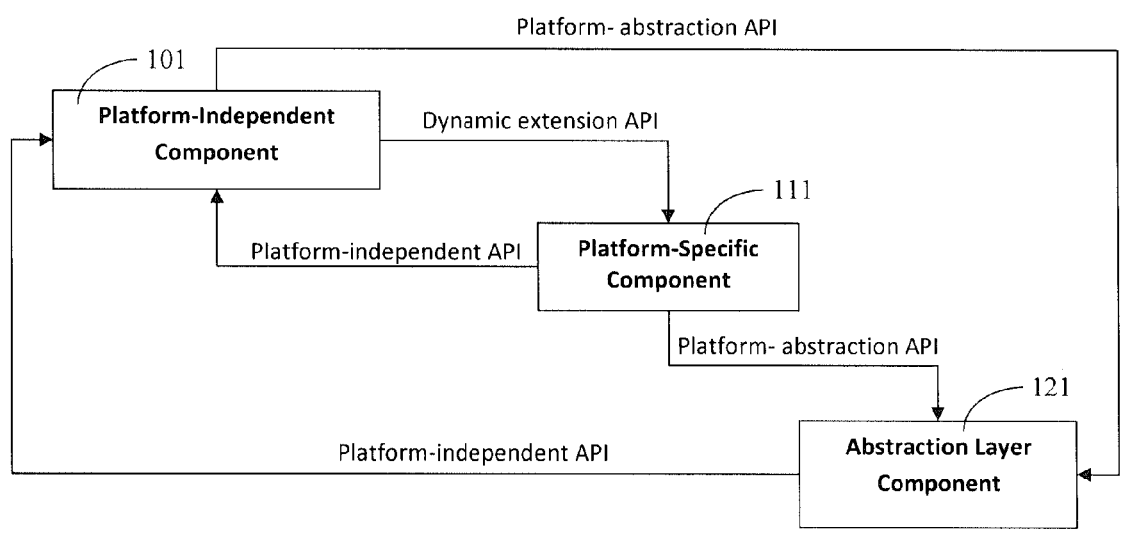
FIG. 5 is an exemplary block diagram depicting an embodiment of the present invention.

By way of example, FIG. 5 illustrates the interconnectedness between the different components of FIG. 1. Platform-independent component 101 may be comprised of platform-independent software source code that communicates and interfaces with the other components by exposing the common API. As shown, platform-independent component 101 may communicate with abstraction layer component 121 using the common API. In turn, abstraction layer component 121 may communicate with platform-independent component 101 using the common API.

Platform-independent component 101 may also communicate with platform-specific component 111 through the use of one or more dynamic extensions. For example, dynamic extensions may be registered with platform-independent component 101 that may call platform-specific component 111 when necessary or desirable. Dynamic extensions are discussed in more detail below. Platform-specific component 111 may communicate with platform-independent component 101 and/or abstraction layer component 121 using the common API.

Figure 2:
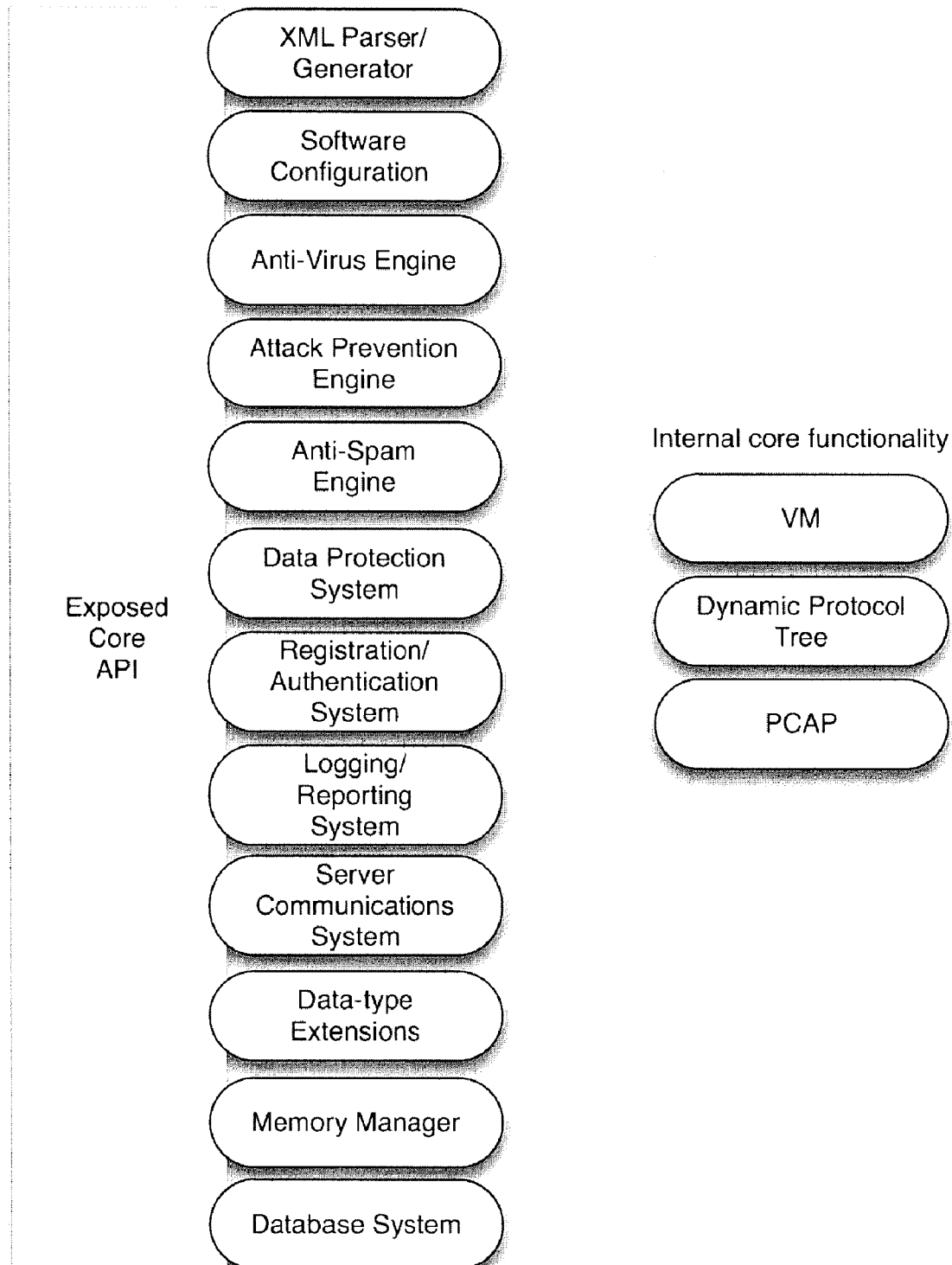
FIG. 2 is an exemplary block diagram depicting an embodiment of the present invention.

FIG. 5 therefore illustrates the various messaging paths utilized by the system components of the present invention. The common API may facilitate this communication and allow access or calling within the system. This enables separation of the various components of the present invention to determine the most efficient use of the system architecture. Development for the cross-platform system is discussed in more detail below. However, at a high level, one will appreciate that platform-independent component 101 exposes a common platform-independent API that provides common functions regardless of the mobile device being used. These functions include but are not limited to a XML parser or generator, the software configuration for the mobile device, an anti-virus engine, an attack prevention engine, an anti-spam engine, a data protection system, a registration/authentication system, a logging or reporting system, a server communications system, data-type extensions, a memory manager or a database system (see FIG. 2).

Figure 3:
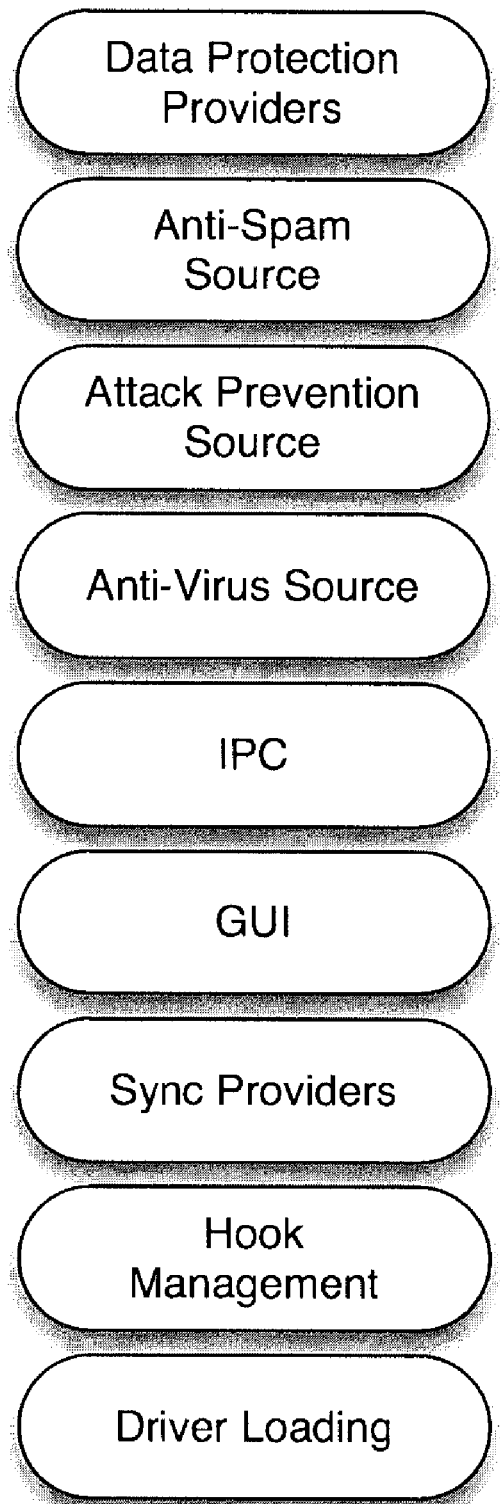
FIG. 3 is an exemplary block diagram depicting an embodiment of the present invention.
Figure 4:
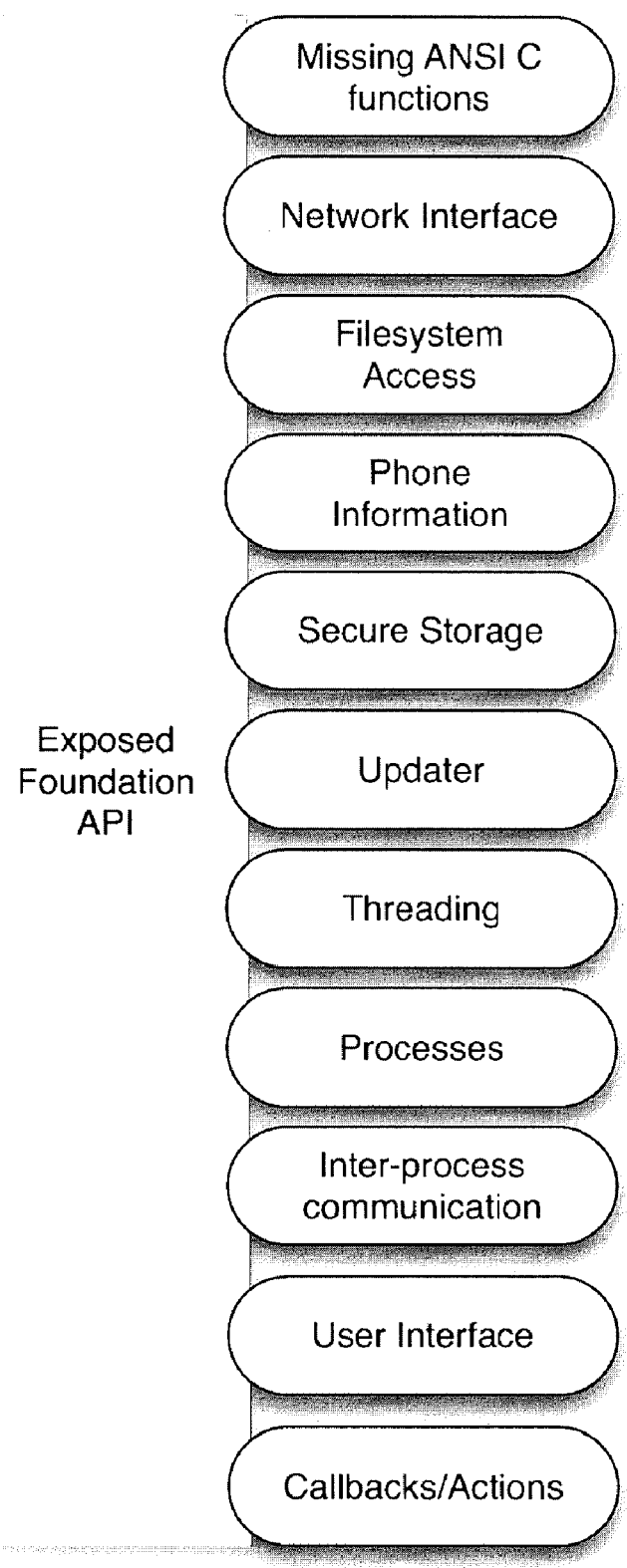
FIG. 4 is an exemplary block diagram depicting an embodiment of the present invention.

The platform-specific component 111 may provide for functionalities that are not common to all mobile communications device platforms. For example, as shown in FIG. 3, these may include data protection providers, anti-spam sources, attack prevention sources, anti-virus sources, IPC, GUI, sync providers, hook management and driver loading. The abstraction layer component that integrates with platform-independent component 101 and communicates with and between platform-independent component 101 and platform-specific component 121 may provide or access other functionalities, such as missing ANSI C functions, network interfaces, file system access, phone or device information, secure storage, an updater, threading, processes, inter-process communication, user interface or callbacks or other actions (FIG. 4).

Other examples of how an application built for use on the cross-platform system are discussed further below. One will appreciate that the above lists are merely exemplary and are not intended to limit the present invention to any one embodiment.

B. Cross-Platform Functionality

Using the system architecture illustrated in FIG. 1 and the messaging pathways illustrated in FIG. 5, the present invention achieves efficient cross-platform functionality by utilizing the specific features of each device platform and/or provider, while at the same time utilizing a powerful platform-independent component 101 library and API as a common code base for all devices. In an embodiment, the cross-platform system relies upon a more specific abstraction layer component 121 than prior art systems. As such, even though abstraction layer component 121 exposes the same API on all mobile communications device platforms, the underlying implementation of the applications running on the cross-platform system differs.

As shown in the figures, the platform-independent component 101 is designed to call and be called by abstraction layer component 121. As previously discussed, prior art systems lack this type of cross-communication. Specifically, prior art cross-platform systems include the capability to call an abstraction layer, but the abstraction layer does not necessarily depend upon or integrate with the calling component. In the present invention, platform-independent code may be incorporated in platform-independent component 101 such that the applications executed on the cross-platform system are minimally implemented in the abstraction layer component 121, and instead rely more on platform-independent component 101 libraries. As such, in the present invention, abstraction layer component 121 allows most application functionalities to execute using platform-independent code. However, the figures also illustrate that platform-independent component 101 may be called by platform-specific component 111, thereby enabling those functionalities that require platform-specific code. The various platform-independent component 101 and platform-specific component 111 code libraries may reside on the device itself, may be accessible on a server, or a combination of both.

This architecture encourages application development that is more efficient and provides better integration with minimal code duplication on the mobile device platform that eventually runs the application. In addition, it allows for the easy creation and maintenance of a software application across multiple handset platforms, minimizing the amount of code that needs to be "ported", re-written, or conditionally compiled/executed. The architecture is designed to isolate the various components that may differ on each device platform from those components that do not differ, while still allowing platform-specific functionality to take advantage of the platform-independent and abstraction components. The development of a software application for this architecture is discussed further in the next section. Implementation of such an application is discussed below.

Figure 6:
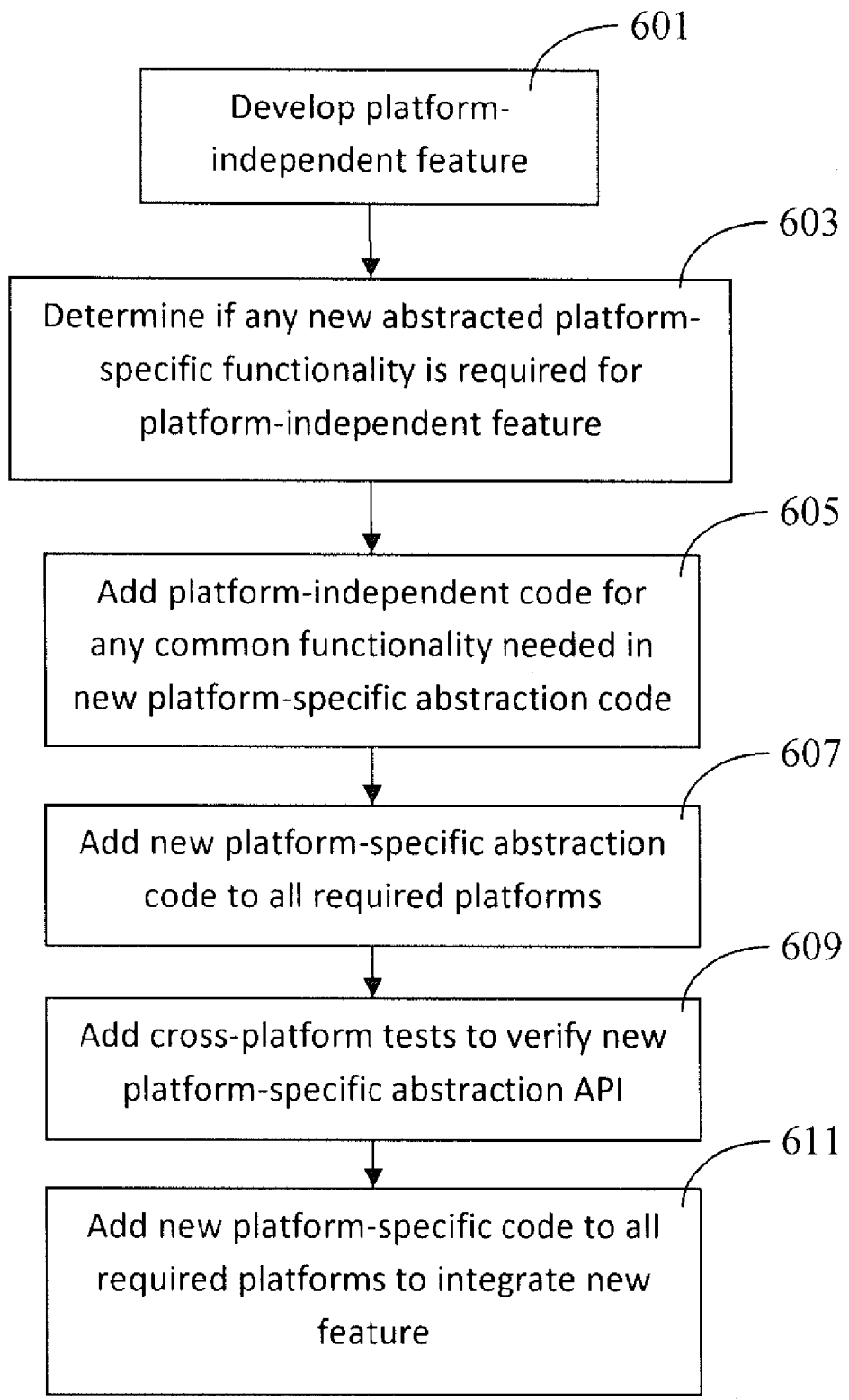
FIG. 6 is an exemplary flow diagram illustrating the steps of an embodiment of the present invention.
Figure 7:
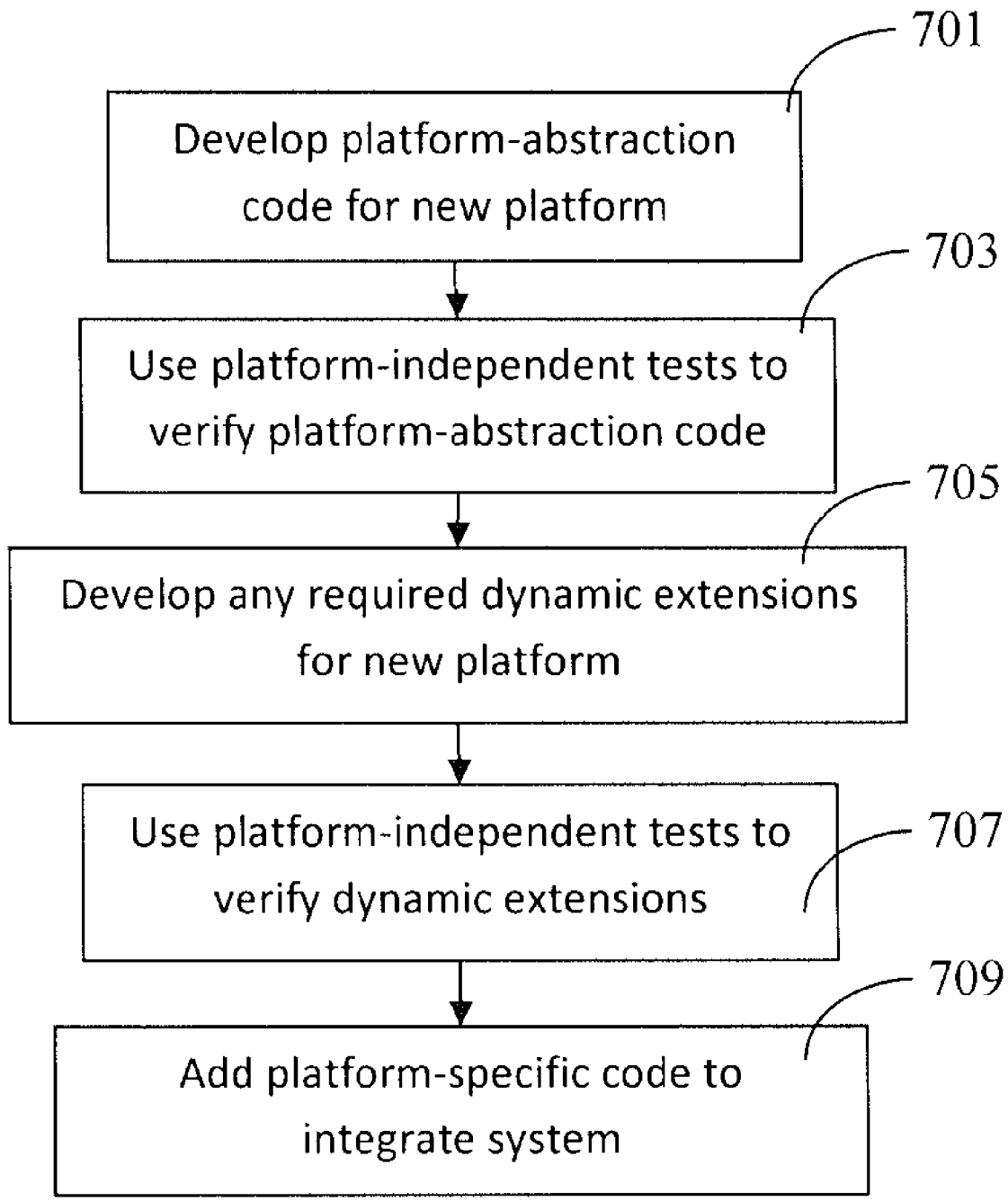
FIG. 7 is an exemplary flow diagram illustrating the steps of an embodiment of the present invention.
Figure 8:
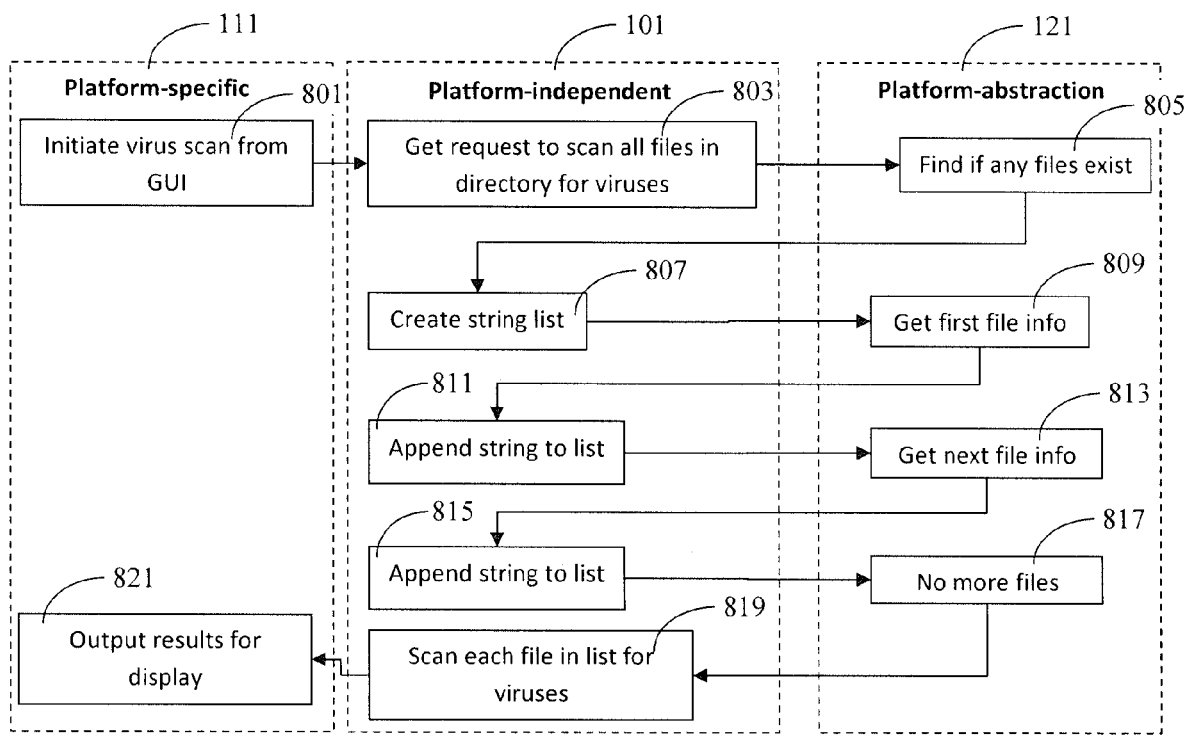
FIG. 8 is an exemplary flow diagram illustrating the steps of an embodiment of the present invention.
Figure 9:
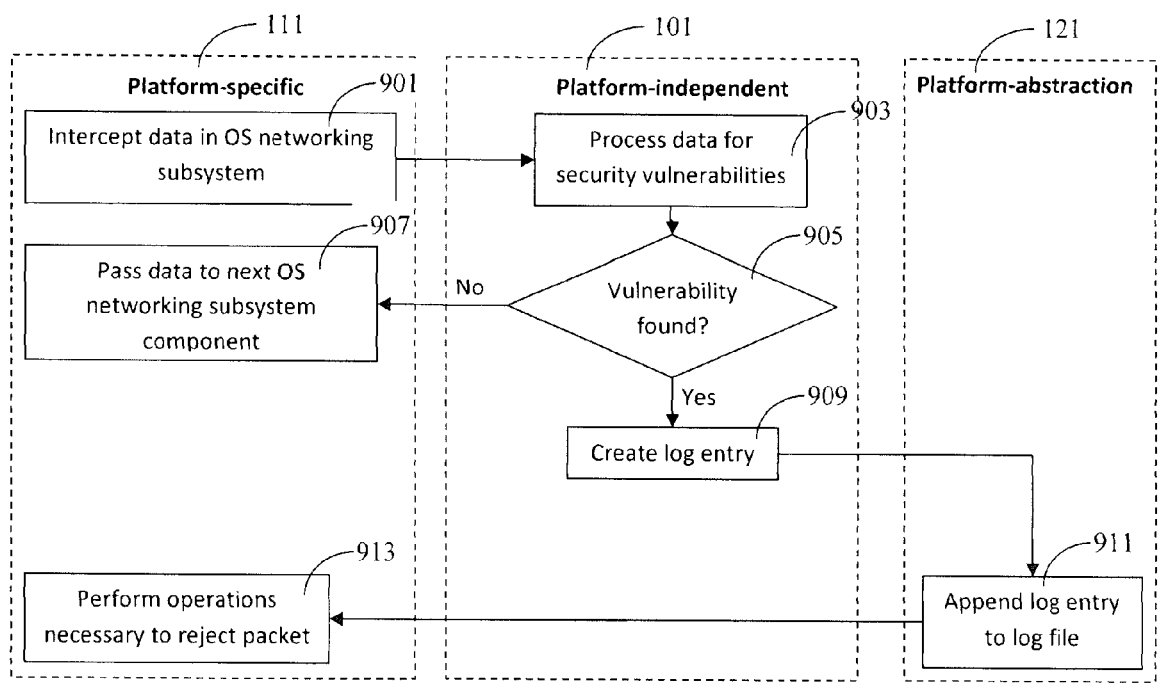
FIG. 9 is an exemplary flow diagram illustrating the steps of an embodiment of the present invention.

FIGS. 8 and 9 illustrate how some applications may be developed for the cross-platform embodiment of the present invention. As such, one will appreciate that the present invention includes the cross-platform system, as well as applications developed using the cross-platform system on a mobile communications device. The actual development process is illustrated in FIGS. 6 and 7, discussed in the next section.

FIG. 8 depicts a simple virus scanning system on a mobile communications device in which platform-independent component 101 and the abstraction layer component 121 are interdependent. In other words, in this embodiment, the abstraction layer is integrally tied to the platform-independent component that it is supporting. In step 801 of FIG. 8, a virus scan may be initiated by using the GUI of the mobile communications device. Because a GUI may differ between mobile communications devices, initiating a virus scan using the GUI may require identifying the platform-specific characteristics of each device. As such, the platform-specific component 111 of the cross-platform system will likely enable this functionality. In step 803, the platform-independent component 101 receives the request to scan data files stored in a directory on the mobile communications device. The method of receiving such a command and performing the scan will likely not differ between each mobile communications device. In other words, the cross-platform anti-virus system will typically use the same detection engines to identify malware and viruses between platforms. As such, the platform-independent component 101 can be tasked with handling such a scan. An example of such a scan is described in co-pending U.S. patent application Ser. No. 12/255,621, filed Oct. 21, 2008, entitled "SYSTEM AND METHOD FOR ATTACK AND MALWARE PREVENTION," incorporated in full herein.

Accessing the directories and underlying files system of a mobile communications device is typically abstracted to a separate interface to avoid direct interaction with the data. As such, platform abstraction layer component 121 may enable the function of locating the files in the directory identified for scanning (step 805). A list of these files may be created by platform-independent component 101 since it will eventually perform the scan (step 807). The steps of identifying files and building a list of those files will be jointly performed or enabled by abstraction layer component 121 and platform-independent component 101 (steps 809, 811, 813, 815, 817). Once complete, the platform-independent component 101 may enable a scan of the identified files (step 819). Results may then be outputted to a display specific to the mobile communications device (step 821). As such, this final step may be performed or enabled by the platform-specific component 111. An example of how such information might be displayed is discussed in U.S. patent application Ser. No. 12/255,635, filed Oct. 21, 2008, issued as U.S. Pat. No. 8,060,936 on Nov. 15, 2011, entitled "SECURITY STATUS AND INFORMATION DISPLAY SYSTEM," incorporated in full herein.

FIG. 9 illustrates an intrusion prevention system using the cross-platform system embodiment of the present invention. This system may be similar to that described in U.S. patent application Ser. No. 12/255,614, filed Oct. 21, 2008, issued as U.S. Pat. No. 8,051,480 on Nov. 1, 2011, entitled "SYSTEM AND METHOD FOR MONITORING AND ANALYZING MULTIPLE INTERFACES AND MULTIPLE PROTOCOLS," incorporated in full herein. As FIG. 9 shows, the balance of functionalities between the platform-specific component 111, platform-independent component 101 and the abstraction layer component 121 may vary depending upon the functionality being enabled or utilized on a mobile communications device. In step 901, data is intercepted in the OS networking subsystem of the mobile communications device. The platform-specific component 111 may enable this functionality to provide access to networking subsystems and network access points that may differ from device to device. However, the processing of this intercepted data will likely not differ from device to device. As such, in step 903, the platform-independent component 101 may handle this processing to determine if the intercepted data contains any vulnerabilities or other security threats (step 905). If not, then the data is allowed to proceed to its intended destination for further processing, which may be the next OS networking subsystem component (step 907). One will appreciate that the abstraction layer component 121 was not involved in this transaction because there were no functions that needed to be abstracted. In this embodiment, the abstraction layer is therefore not interdependent on any other component of the cross-platform system.

However, if a vulnerability or security threat is identified by the platform-independent component 101, then the platform-independent component 101 may create and store a log entry or otherwise record the security event (step 909). The function of appending the log entry to a log file may be performed by the abstraction layer component 121 (step 911), since this may be considered a file system or data file interaction not suited for the platform-independent component 101. Treatment of the infected data, such as rejection from further processing, deletion or quarantine, may be handled by the platform-specific component 111 since the process of implementing treatment may differ between mobile communications devices (step 913).

The above examples illustrate some benefits of the present invention. One will appreciate that when applied to mobile device security software, the present invention helps combat criminal and cyber-terrorist attacks by enabling rapid response to emerging threats. Mobile communications devices are already recognize as an integral part of society's infrastructure, supporting data and voice communications for commerce, government and security. As such, it is of extreme importance to the functioning of both government and commerce that such devices remain functional and not compromised. As discussed previously and throughout, the present invention allows security functionality to be written in platform-independent code, even though this functionality needs to be tightly integrated with the operating system on which it runs. Cyber-attacks can thereby be stopped on all supported platforms by adding security and protection functionality to the platform-independent component and deploying an updated version of the security software. By requiring only one version of the protection functionality for these cyber-attacks, the present invention enables a substantial increase in the ability to respond quickly to vulnerabilities affecting multiple mobile device platforms.

In prior art cross-platform systems and methods, the abstraction layer, in addition to including abstracted functionalities, also includes platform-specific and platform-independent functionalities. In the present invention, the abstraction layer does not include these different functionalities. Instead, the abstraction layer component 121 is kept lightweight, and is designed to rely on abstracted functionalities provided by the platform-independent component 101. Conversely, platform-independent component 101 may call abstraction component 121 as needed, thereby ensuring a two-way interdependency, when optimal, between platform-independent component 101 and abstraction component 121. As a result, during software development for the present invention's cross-platform system, a greater proportion of software code may be cross-platform.

The present invention therefore functions by virtue of the tightly integrated and non-general abstraction layer component 121. Because of the specific design of the abstraction layer component 121, the present invention provides cross-platform functionality for low-level functions, such as security or other features that require communication with a device's operating system. Additionally, the present invention does not require much code duplication between platforms. A greater proportion of code may be written to the platform-independent component 101, thereby lightening the abstraction layer 121 and enabling more devices to be cross-platform.

C. Development for the Cross-Platform System

As previously discussed, application development for the cross-platform system of the present invention may require that software engineers and programmers determine initially which features of the application can depend upon platform-independent functionalities, and which features can depend upon platform-specific functionalities. Development may involve compiling programs and code using portions of the cross-platform system library that may stored on a remote server, or may involve using a toolkit or similar software development kit that contains portions of the cross-platform library stored locally. Developers may upload finished or partially finished applications to a server or servers for distribution to mobile communications device users, thereby ensuring distribution and verification on different devices.

These applications may then be downloaded or otherwise transferred to a mobile communications device, regardless of the hardware or software platform, so long as the device or the software being downloaded contains the cross-platform system.

By way of example, FIG. 6 illustrates a possible software development method for creating or adding a new feature to a mobile communications device that may rely upon some platform-specific functionality. In step 601, the platform-independent feature may initially be developed. The software engineer may then determine if any new abstracted platform-specific functionality is required for the platform-independent feature (step 603). If so, then in step 605, platform-independent code for any common functionality in new platform-specific abstraction code may be added. This new platform-specific abstraction code may then be added to all required platforms (step 607). Cross-platform tests must then be performed to verify the new platform-specific abstraction API (step 609). Alternatively, tests may be performed to verify compatibility with the common API. If the tests are successful and the platform-specific code performs as expected, then the new platform-specific code may be added to all required platforms, thereby integrating the new feature (step 611).

In some instances, the software engineer or programmer may need to integrate a new mobile communications device with the present invention's cross-platform system. This may require an evaluation of the device's configuration and features, and a determination of which aspects of the device may rely upon the platform-independent component 101 already adopted and implemented across all other previously-integrated mobile communications devices, as well as a determination of the platform-specific features that can be integrated into a new platform-specific component 111 for the new device. Further, this may necessarily require development of an abstraction layer component 121 to implement and interface with the platform-independent component 101 and the platform-specific component 111 that will be installed for the new device.

FIG. 7 illustrates an exemplary cross-platform development method to add support for a new mobile communications device or platform. In step 701, the abstraction layer component 121 may be developed for the new device or platform. The new abstraction layer component 121 must then be tested using platform-independent verification to ensure that the abstraction layer component 121 code performs as expected. Since the mobile communications device itself may include functionalities, features or hardware components that differ from other devices, these different functionalities may be addressed through dynamic extensions. These dynamic extensions may be developed for the new platform (step 705). Verification of these dynamic extensions may also be tested using platform-independent tests (step 707). Once the dynamic extensions and abstraction layer component 121 have been verified, the platform-specific code may be added to the mobile communications device (step 709), thereby integrating the platform-independent component 101, abstraction layer component 121 and platform-specific component 111 on the device.

In the previous example, the software engineer or programmer may need to consider developing dynamic extensions for and on the mobile communications device. One will appreciate that service providers for these devices may request that certain device functions be disabled or removed. Similarly, one will appreciate that even though two devices may use the same operating system, they perform functions differently. Dynamic extensions offer a way to take advantage of the individual features of a mobile communications device that may not be present on other mobile communications device, even if those devices are from the same manufacturer or use the same operating system. By adding dynamic extensions for the mobile communications device during development (step 705), the cross-platform system of the present invention may recognize and determine the unique functionalities of the device at run-time.

For example, software may be developed for an entire mobile device platform or operating system, such as Android™ or Windows Mobile®. However, specific mobile communications devices that run the Android platform may differ from other devices running the Android platform. Specifically, some devices may possess functionalities that do not exist on others (such as a SIM card contact-list storage). By developing and adding dynamic extensions to the cross-platform system of the present invention, the system may determine which dynamic extensions it may wish to register with the platform-independent component 101 on the device, thereby allowing a single executable to support a variety of individual device configurations on the platform.

One will appreciate that the above examples describe a few exemplary methods for developing and adding to the cross-platform system of the present invention. The above examples are not intended to limit the invention in any way, and one will appreciate that other development methods are possible without departing from this disclosure or the scope of the present invention.

D. Quality Assurance/Testing for the Cross-Platform System

As previously discussed, the system architecture of the present invention streamlines the testing and verification of applications for the cross-platform system. An embodiment of the present invention contemplates a common platform-independent component 101 for all mobile communications device platforms that communicates with the platform abstraction layer component 121. In other words, the abstraction layer component 121 exposes the same platform-independent component 101 API on all mobile communications device platforms, but each platform implements the system differently depending upon its configuration. In any event, because the same platform-independent component 101 API exists on all mobile communications devices, testing to ensure that the abstraction layer component 121 integrates with this platform-independent component 101 is more easily and efficiently performed than on cross-platform systems that do not implement the present invention's system architecture. As a result, testing systems and algorithms may be refined and re-used repeatedly in order to verify that the abstraction layer component 121 performs as expected. The present invention does not require different testing systems and algorithms for every instance of the abstraction layer, as is required in the prior art. Similarly, any dynamic extensions developed for a platform are easily tested and verified. Even though dynamic extensions may differ between mobile devices because of different configurations, the dynamic extensions for a particular platform will still possess a common API specification. As such, the common API specification may be verified with a common test. By allowing for the use of common and re-usable testing algorithms, the QA portion of the development cycle is shortened. Developers and QA engineers do not need to create new tests, thereby saving time and expediting launch of new applications and devices using the cross-platform system of the present invention.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method comprising:
   a) providing a cross-platform system on a mobile communication device that includes a platform-independent component, a platform-specific component and an abstraction layer component, wherein the platform-independent component explicitly depends upon an application programming interface (API) exposed by the abstraction layer component and the abstraction layer component explicitly depends upon an API exposed by the platform-independent component, wherein the platform-specific component is capable of being called by the platform-independent component using a dynamic extension, and wherein the platform-independent component and the dynamic extension are capable of functioning on any of a plurality of different types of mobile communications devices;
   b) using a graphical user interface on the mobile communications device, initiating a virus/malware scan of files stored on the mobile communications device using the platform-specific component;
   c) at the platform-independent component, receiving a request from the platform-specific component to scan data files stored in a directory on the mobile communications device;
   d) at the abstraction layer component, receiving a request from the platform-independent component to locate and to identify the files in the directory identified for scanning;
   e) by cooperation of the abstraction layer component and the platform-independent component, building a list of files to be scanned for viruses and/or malware;
   f) at the platform-independent component, performing a scan of the files contained in the list to identify one or more files that may contain viruses and/or malware; and,
   g) from the platform-independent component to the platform-specific component, outputting the results of the scan performed by the platform-independent component.

2. The method of claim 1, after step (g), further comprising the step of displaying on the mobile communications device graphical user interface by the platform-specific component information related to the results of the scan performed by the platform-independent component.

3. A method comprising:
   a) providing a cross-platform system on a mobile communication device that includes a platform-independent component, a platform-specific component and an abstraction layer component, wherein the platform-independent component explicitly depends upon an application programming interface (API) exposed by the abstraction layer component and the abstraction layer component explicitly depends upon an API exposed by the platform-independent component, wherein the platform-specific component is capable of being called by the platform-independent component using a dynamic extension, and wherein the platform-independent component and dynamic extension are capable of functioning on any of a plurality of different types of mobile communications devices;
   b) at the platform-specific component, intercepting incoming data prior to its arrival at its intended destination;
   c) at the platform-independent component, processing the intercepted data to determine whether it has any security vulnerabilities;
   d) if there are no security vulnerabilities in the processed data, at the platform-specific component, allowing the intercepted and processed data to proceed to its intended destination;
   e) if there are security vulnerabilities identified in the processed data, then at the platform-independent component creating and storing a log entry;
   f) at the abstraction layer component, appending the log entry from the platform-independent component to a log file; and,
   g) at the platform-specific component, implementing the treatment of the data identified as possessing security vulnerabilities.

4. The method of claim 3 wherein the step of implementing treatment includes a process selected from the group consisting of rejecting the data from further processing, deleting the data, and quarantining the data.

5. A non-transitory computer-readable storage medium having stored thereon a plurality of instructions which, when executed by a processor, cause the processor to perform the steps of a method comprising:
   a) providing a cross-platform system on a mobile communication device that includes a platform-independent component, a platform-specific component and an abstraction layer component, wherein the platform-independent component explicitly depends upon an application programming interface (API) exposed by the abstraction layer component and the abstraction layer component explicitly depends upon an API exposed by the platform-independent component, wherein the platform-specific component is capable of being called by the platform-independent component using a dynamic extension, and wherein the platform-independent component and dynamic extension are capable of functioning on any of a plurality of different types of mobile communications devices;
   b) using a graphical user interface on the mobile communications device, initiating a virus/malware scan of files stored on the mobile communications device using the platform-specific component;
   c) at the platform-independent component, receiving a request from the platform-specific component to scan data files stored in a directory on the mobile communications device;
   d) at the abstraction layer component, receiving a request from the platform-independent component to locate and to identify the files in the directory identified for scanning;
   e) Computer program code for, by cooperation of the abstraction layer component and the platform-independent component, building a list of files to be scanned for viruses and/or malware;
   f) at the platform-independent component, performing a scan of the files contained in the list to identify one or more files that may contain viruses and/or malware; and,
   g) from the platform-independent component to the platform-specific component, outputting the results of the scan performed by the platform-independent component.

6. The non-transitory computer readable storage medium of claim 5, further comprising, after the outputting of step (g), displaying on the mobile communications device graphical user interface by the platform-specific component information related to the results of the scan performed by the platform-independent component.

7. A non-transitory computer-readable storage medium having stored thereon a plurality of instructions which, when executed by a processor, cause the processor to perform the steps of a method comprising:
    a) providing a cross-platform system on a mobile communication device that includes a platform-independent component, a platform-specific component and an abstraction layer component, wherein the platform-independent component explicitly depends upon an application programming interface (API) exposed by the abstraction layer component and the abstraction layer component explicitly depends upon an API exposed by the platform-independent component, wherein the platform-specific component is capable of being called by the platform-independent component using a dynamic extension, and wherein the platform-independent component and dynamic extension are capable of functioning on any of a plurality of different types of mobile communications devices;
    b) at the platform-specific component, intercepting incoming data prior to its arrival at its intended destination;
    c) at the platform-independent component, processing the intercepted data to determine whether it has any security vulnerabilities;
    d) if there are no security vulnerabilities in the processed data, at the platform-specific component, allowing the intercepted and processed data to proceed to its intended destination;
    e) if there are security vulnerabilities identified in the processed data, then at the platform-independent component creating and storing a log entry;
    f) at the abstraction layer component, appending the log entry from the platform-independent component to a log file; and,
    g) at the platform-specific component, implementing the treatment of the data identified as possessing security vulnerabilities.

8. The non-transitory computer readable storage medium of claim 7 wherein the step of implementing treatment includes a process selected from the group consisting of rejecting the data from further processing, deleting the data, and quarantining the data.

9. A non-transitory computer-readable medium having stored thereon a plurality of instructions which, when executed by a processor, cause the processor to perform the method comprising:
    a) requesting an action by a platform-specific component on a mobile communication device from a platform-independent component on the mobile communication device;
    b) requesting, by the platform-independent component, file identification information data from an abstraction layer component on the mobile communication device about application files and data files stored on the mobile communication device, wherein the abstraction layer component explicitly depends upon an application programming interface (API) exposed by the platform-independent component and the platform-independent component explicitly depends upon an API exposed by the abstraction layer component and wherein the platform-specific component is capable of being called by the platform-independent component using a dynamic extension;
    c) returning, by the abstraction layer component, file identification information to the platform-independent component; and,
    d) performing the action by the platform-independent component using the file identification information from the abstraction layer component, wherein the action comprises performing a scan of the mobile communication device to determine the presence of a security threat in the application files and data files stored on the mobile communication device, the security threat selected from a group consisting of viruses, malware, software or hardware exploits, attempts to hijack the mobile communication device, denial of service attacks, spoofing, social engineering attacks, worms, and other computer contaminants.

10. The computer program product of claim 9, further comprising the step of outputting the results of the data scan for display utilizing the platform-specific component.

\* \* \* \* \*